(12) United States Patent
Waterhouse et al.

(10) Patent No.: US 7,328,303 B1
(45) Date of Patent: Feb. 5, 2008

(54) METHOD AND SYSTEM FOR REMOTE EXECUTION OF CODE ON A DISTRIBUTED DATA STORAGE SYSTEM

(75) Inventors: Steven Richard Waterhouse, San Francisco, CA (US); Sherif M. Botros, Redwood Shores, CA (US); Patrick Gates, San Francisco, CA (US); Akhil Arora, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 276 days.

(21) Appl. No.: 10/883,243

(22) Filed: Jun. 30, 2004

(51) Int. Cl.
*G06F 12/00* (2006.01)

(52) U.S. Cl. ...................................... 711/112

(58) Field of Classification Search ................ 711/112
See application file for complete search history.

(56) References Cited

U.S. PATENT DOCUMENTS

| | | | | |
|---|---|---|---|---|
| 5,640,286 A | * | 6/1997 | Acosta et al. ................ | 360/48 |
| 5,689,727 A | * | 11/1997 | Bonke et al. ................ | 710/20 |
| 6,108,703 A | | 8/2000 | Leighton et al. ........... | 709/226 |
| 6,182,121 B1 | | 1/2001 | Wlaschin .................... | 709/215 |
| 6,185,601 B1 | | 2/2001 | Wolff ........................ | 709/203 |
| 6,230,200 B1 | | 5/2001 | Forecast et al. ........... | 709/226 |
| 6,262,976 B1 | | 7/2001 | McNamara ................ | 370/254 |
| 6,272,136 B1 | | 8/2001 | Lin et al. .................... | 370/392 |
| 6,272,522 B1 | | 8/2001 | Lin et al. .................... | 709/200 |
| 6,295,564 B1 | * | 9/2001 | Shigetomi et al. ........... | 710/74 |
| 6,424,621 B1 | | 7/2002 | Ramaswamy et al. ...... | 370/230 |
| 6,496,883 B2 | * | 12/2002 | Shigetomi et al. ........... | 710/74 |
| 6,557,076 B1 | * | 4/2003 | Copeland et al. ........... | 711/118 |
| 6,567,905 B2 | | 5/2003 | Otis ........................... | 711/170 |
| 6,725,392 B1 | | 4/2004 | Frey et al. .................... | 714/6 |
| 6,996,501 B1 | * | 2/2006 | Rothberg .................... | 702/186 |
| 7,024,582 B2 | | 4/2006 | Loy et al. .................... | 714/4 |
| 7,117,201 B2 | | 10/2006 | Kuno et al. ................ | 707/3 |
| 2003/0009563 A1 | | 1/2003 | Douglis et al. ............. | 709/227 |
| 2003/0188097 A1 | | 10/2003 | Holland et al. ............. | 711/114 |
| 2004/0003055 A1 | | 1/2004 | Holland et al. ............. | 709/219 |
| 2004/0073582 A1 | | 4/2004 | Spiegel ....................... | 707/204 |
| 2004/0205110 A1 | * | 10/2004 | Hinshaw ..................... | 709/201 |
| 2005/0165662 A1 | * | 7/2005 | Shigetomi et al. ............ | 705/27 |
| 2005/0273686 A1 | | 12/2005 | Turner et al. ............... | 714/752 |
| 2005/0283645 A1 | | 12/2005 | Turner et al. ................ | 714/4 |

\* cited by examiner

*Primary Examiner*—Tuan V. Thai
*Assistant Examiner*—Ryan Dare
(74) *Attorney, Agent, or Firm*—Gunnison, McKay & Hodgson, L.L.P.; Lisa A. Norris (57) ABSTRACT

In accordance with the invention, a data storage system for storing and retrieving fixed data content includes: a storage system network; one or more peer node computer systems interconnected by the storage system network; and at least one disklet stored on at least one of the one or more peer node computer systems, the disklet for execution on the data storage system using data that are stored on, being written to, or being read from the data storage system. In one embodiment, a disklet includes executable program code and a disklet interface that permits the program code of the disklet to be loaded on to the data storage system and executed on the data storage system by a user.

20 Claims, 8 Drawing Sheets

METHOD AND SYSTEM FOR REMOTE EXECUTION OF CODE ON A DISTRIBUTED DATA STORAGE SYSTEM

BACKGROUND OF THE INVENTION

1. Field of the Invention

The present invention is directed to the field of data storage. In particular, the present invention is directed to the execution of program code on a distributed data storage system.

2. Description of Related Art

The quantity of fixed data content, such as text files and image files, is rising rapidly. For example, the Internet Archive WayBack Machine (www.archive.org) currently archives 30 billion web pages.

Further, compliance with stricter government regulations is requiring the storage of large amounts of selected data, such as securities and medical data, together with procedures for timely and verifiable retrieval of this data from the data storage system.

Due to rapidly increasing processor performance and disk storage size, data is increasingly stored on computer-based data storage systems, and, particularly, disk drives. However, while the storage capacity on disk drives has progressed rapidly, the ability to locate, access, and retrieve selected data has not progressed at the same rate. In particular, once selected data is located in a data storage system, the retrieval of the data is still limited by the performance of the disk head to write or read the data to or from the disk, as well as the bandwidth of the communication channels used to transfer the data into or out of the data storage system.

Prior art data storage systems primarily based the reliability of the data storage system on the hardware utilized by the system. Thus, many prior art storage systems often used highly configured data storage systems with costly hardware and inflexible architectures to attempt to manage the storage and retrieval of data in large data storage systems. If a component failed, a system administrator was often immediately notified to repair or replace the component to prevent failure of the system. Consequently, one or more system administrators were sometimes needed to maintain the hardware, and thus the reliability of the data storage system, or other level of quality of service.

Additionally, most prior art data storage systems permitted modification of data stored on the data storage system. Thus, to maintain coherent data, these prior art data storage systems often utilized lock managers that prevented concurrent modification of stored data. Disadvantageously, the lock managers often became a bottleneck in the data storage system.

Further, if a user desired to execute an application using data stored on a prior art data storage system, the data had to be located on the data storage system, transferred from the data storage system to the user's system, and then the application could be executed using the transferred data on the user's system. Where large amounts of data were requested, data transfer was often a lengthy process due to bandwidth limitations of the communications channels used to transfer the data. Additionally, once the user received the data, the user was limited to the processing capabilities of their computer system.

SUMMARY OF THE INVENTION

In accordance with the invention, a data storage system for storing and retrieving fixed data content includes: a storage system network; one or more peer node computer systems interconnected by the storage system network; and at least one disklet stored on at least one of the one or more peer node computer systems, the disklet for execution on the data storage system. In various embodiments, the disklet is executed on the data storage system using data that are stored on, being written to, or being read from the data storage system.

In accordance with the invention, a disklet includes program code and a disklet interface that permits the program code of the disklet to be loaded on to the data storage system and executed on the data storage system.

BRIEF DESCRIPTION OF THE DRAWINGS

The accompanying drawings, which are incorporated in, and constitute a part of this specification, illustrate embodiments of the invention, and together with the description, serve to explain the invention.

In the drawings, the same reference numbers are used to denote similar components in the various embodiments.

In the drawings.

DETAILED DESCRIPTION

The invention will now be described in reference to the accompanying drawings. The same reference numbers may be used throughout the drawings and the following description to refer to the same or like parts.

Figure 1:
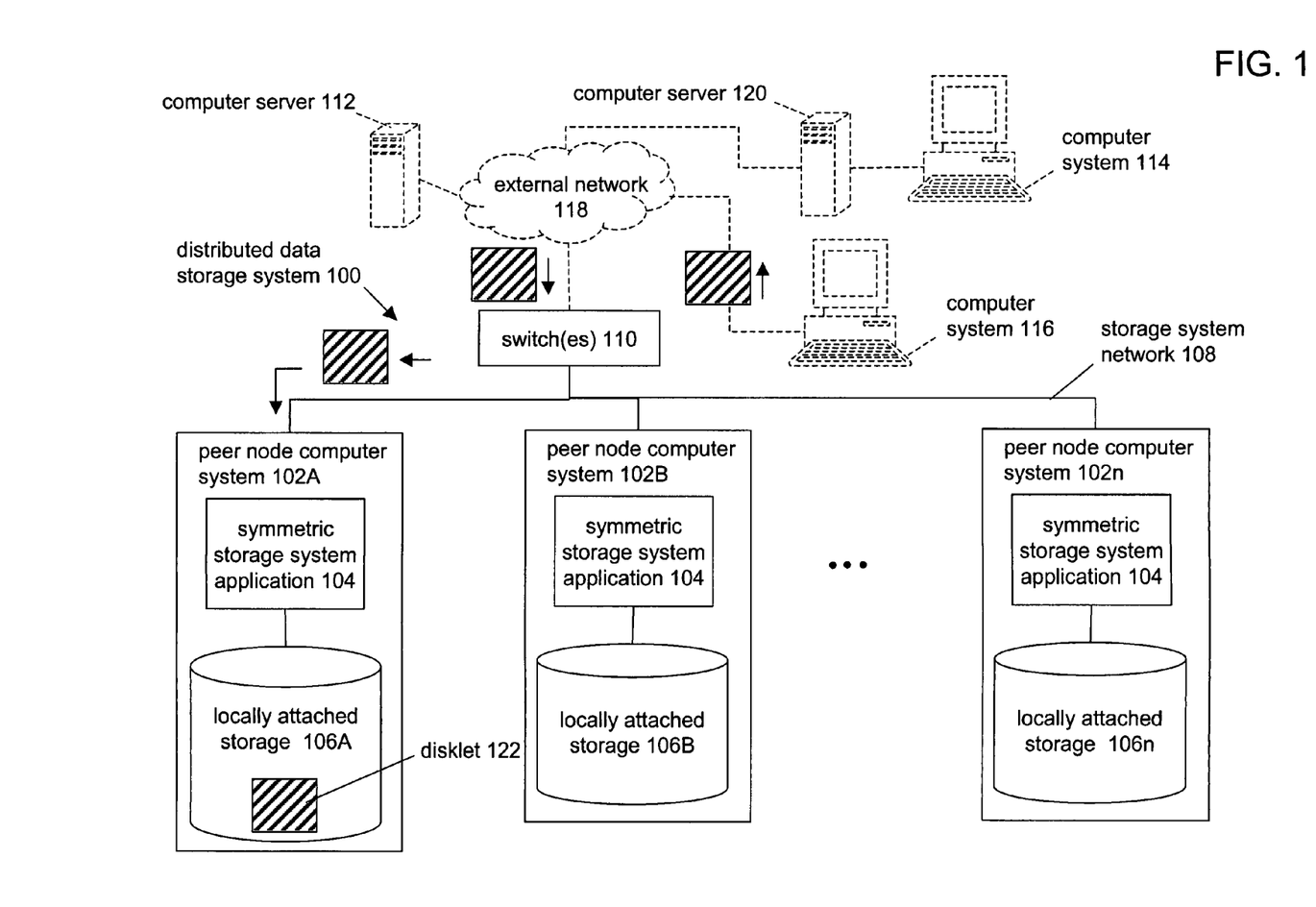
FIG. 1 illustrates a diagram of a distributed data storage system in accordance with one embodiment of the invention.

FIG. 1 illustrates a diagram of a distributed data storage system 100 including a disklet 122 in accordance with one embodiment of the invention. In one embodiment, disklet 122 is code including a disklet interface that allows the disklet to interact with data storage system 100 and to execute on data storage system 100. In one embodiment, disklet 122 is executed on data storage system 100 using data, e.g., data objects, which are stored on, being written to, or being read from data storage system 100. In one embodiment, disklet 122 is generated at a computer system external to data storage system 100, such as computer system 116, and transferred to data storage system 100. In one embodiment, disklet 122 is precompiled code, such as Java® byte code, and the disklet interface, such as a Java® application program interface (API), permits the program code of disklet 122 to be transferred to, executed on, and managed by data storage system 100.

By using disklets, e.g., disklet 122, on data storage system 100, applications are performed close the data and output data movement from data storage system 100 is minimized. In particular, applications that require a large amount of scanning, rather than retrieval, can execute, e.g., run, directly on data storage system 100. Consequently, data does not have to be initially transferred out of data storage system 100 to a user for processing. Instead, disklets are run on data storage system 100, and the result of the disklet execution is stored for access by the user or transferred to the user.

Further, disklets allow the functionalities of data storage system 100 to be extended, e.g., redefined, by providing some programmability of the functionalities. For example, a store function can be extended to encrypt data prior to storing the data on data storage system 100.

Additionally, disklets allow information life cycle management to be performed directly on data storage system 100. For example, a disklet can run as a background process and scan data for adherence to document management policies and can evaluate which data needs to be deleted, for example, if the data is older than a specified document time storage requirement.

Also, disklets leverage the compute power of data storage system 100. Compute capacity external to data storage system 100 is not needed to process data on data storage system 100. Disklets utilize the existing compute capacity of data storage system 100. Further, as disklets can utilize the components of data storage system 100, for example have access to component application program interfaces (APIs), disklets can be used to increase system efficiencies of data storage system 100.

In the present embodiment, a disklet is described herein as implemented data storage system 100, however those of skill in the art can recognize that a disklet can be implemented on other data storage systems. As illustrated in FIG. 1, in one embodiment, distributed data storage system 100, hereinafter referred to as storage system 100, includes a plurality of peer node computer systems 102A-102n, hereinafter referred to as nodes 102A-102n, interconnected by a storage system network 108. In one embodiment, each node 102A-102n includes a network protocol interface that allows data objects to be stored, retrieved, and operated on in storage system 100 through any of nodes 102A-102n. Further, in one embodiment, each node 102A-102n is assigned a different IP address.

In the present embodiment, each node 102A-102n includes a symmetric storage system application 104 connected to locally attached storage 106A-106n, respectively. For example symmetric storage system application 104 is connected to locally attached storage 106A in node 102A. In storage system 100, symmetric storage system application 104 is symmetric, i.e., the same, across all of nodes 102A-102n, however, the hardware components that make up each node 102A-102n, for example, locally attached storage 106A, need not be symmetric.

Each node 102A-102n is a complete compute and storage unit and includes all the software required to run storage system 100. In one embodiment, the group of one or more nodes 102A-102n, for example, sixteen nodes, are termed a cell, and management of the cell is by any of nodes 102A-102n (at any one time), herein termed a master node. In one embodiment, selection of a master node is determined using an election process. Election processes are well known to those of skill in the art and are not further described herein for clarity of description of the present invention.

In one embodiment, each node 102A-102n provides status information over storage system network 108 that is received by the other nodes and used to build and maintain individual views of the cell, herein termed a cell view. In one embodiment, a cell view includes information about whether a node 102A-102n is active and available for storage of data and about which node 102A-102n is the master node. In other embodiments, the status information provided by each node 102A-102n and the cell view includes additional information, such as the availability of individual storage structures in each locally attached storage 106A-106n, and data storage levels of each locally attached storage 106A-106n.

When a node failure is detected in the cell view, each affected node 102A-102n in storage system 100 independently starts a recovery process to reconstruct data stored on the failed node or on a locally attached storage allowing distributed and balanced recovery of data in which the storage reliability of a data object is maintained.

In FIG. 1, some of nodes 102A-102n can be active and available, herein termed on-line, while some others of nodes 102A-102n may not be actively available, herein termed off-line. Any of nodes 102A-102n can be selectively brought on-line or taken off-line in storage system 100 as needed. In the present description, a node 102A-102n is assumed to be on-line and available unless otherwise specified.

In one embodiment, each of nodes 102A-102n is a field replaceable unit (FRU). In one embodiment, when a new node is added to storage system 100, the new node is automatically recognized by storage system 100 and any needed applications, such as symmetric storage system application 104, is automatically loaded on to the new node from one of nodes 102A-102n. The new node is then registered with storage system 100, any needed formatting is performed, and any data transfer to the new node occurs.

Data is stored on storage system 100 as data objects. Herein a data object is data of a finite length that is separately identifiable from other data objects and is transferable to storage system 100, for example, a text file, an image file, or a program file, among others. In one embodiment, a layout map ID is generated and associated with a data object. The layout map ID is used to generate a layout map for distributed placement of the data object on storage system 100. A unique object identifier (ID) is generated based on an intrinsic property of the data object, such as the content of the data object, which identifies the data object and provides content addressability for the data object. The data object is divided into data fragments to permit distributed placement of the data object on storage system 100.

During fragmentation of a data object, parity fragments are also generated in accordance with external criteria, such as a desired reliability of storage. The data fragments and the parity fragments are distributively stored on storage system 100 in accordance with the layout map and associated with the unique object ID.

System metadata is also generated during fragmentation of a data object, and at least a portion of this system metadata is stored with each data fragment and parity fragment and is used to reconstruct the data object. Metadata generated from other sources, termed extended metadata, can also be associated with a data object. Thus, although a data object has a single object ID, several metadata can be associated with the object ID.

In one embodiment, a unique metadata object identifier (ID) is generated for each metadata associated with a data object. In one embodiment, selected metadata are indexed and stored in one or more metadata caches to provide enhanced searching and retrieval of data objects on storage system 100.

In the present embodiment, access to storage system 100, and, in particular, to nodes 102A-102n, is via a switch 110. In some embodiments, one or more switches 110 are utilized, for example, to provide redundancy or back-up in the event of failure of a switch 110.

In one embodiment, switch 110 is configured to support communications on two networks: an external network for external traffic between storage system 100 and external clients, such as computer servers 112 and 120, and computer system 116 on external network 118; and an internal network, i.e., storage system network 108, for internal traffic between nodes 102A-102n.

In one embodiment, switch 110 is configured to present two IP addresses to the external network: a virtual IP address for client access to storage system 100; and, an administrative IP address used to access both switch 110 and a node 102A-102n designated as the master node. The administrative IP address is further used to permit administration of storage system 100, such as by a system administrator, for example on computer system 114. In this embodiment, although each of nodes 102A-102n has an associated IP address, nodes 102A-102n are abstracted from clients on the external network, allowing nodes 102A-102n, to be viewed as a single entity.

Requests, such as store and retrieve requests, received by switch 110 are sent to a node 102A-102n in storage system 100 using a load spreading mechanism, such as according to a switching table utilized by switch 110. In one embodiment, the switching table is periodically updated, e.g., reconfigured, by one or more of nodes 102A-102n to dynamically effect a desired load spreading on storage system 100.

In an alternative embodiment, rather than switch 110 presenting a single IP address to external clients, each node 102A-102n presents its assigned IP address to the external network via switch 110, and, rather than load spreading occurring at switch 110, a basic load spreading mechanism is included with a client API (resident at the client) in order to spread the load among nodes 102A-102n. In one embodiment, a listing of nodes 102A-102n is passed to the client API in order to effect the load spreading.

Figure 2:
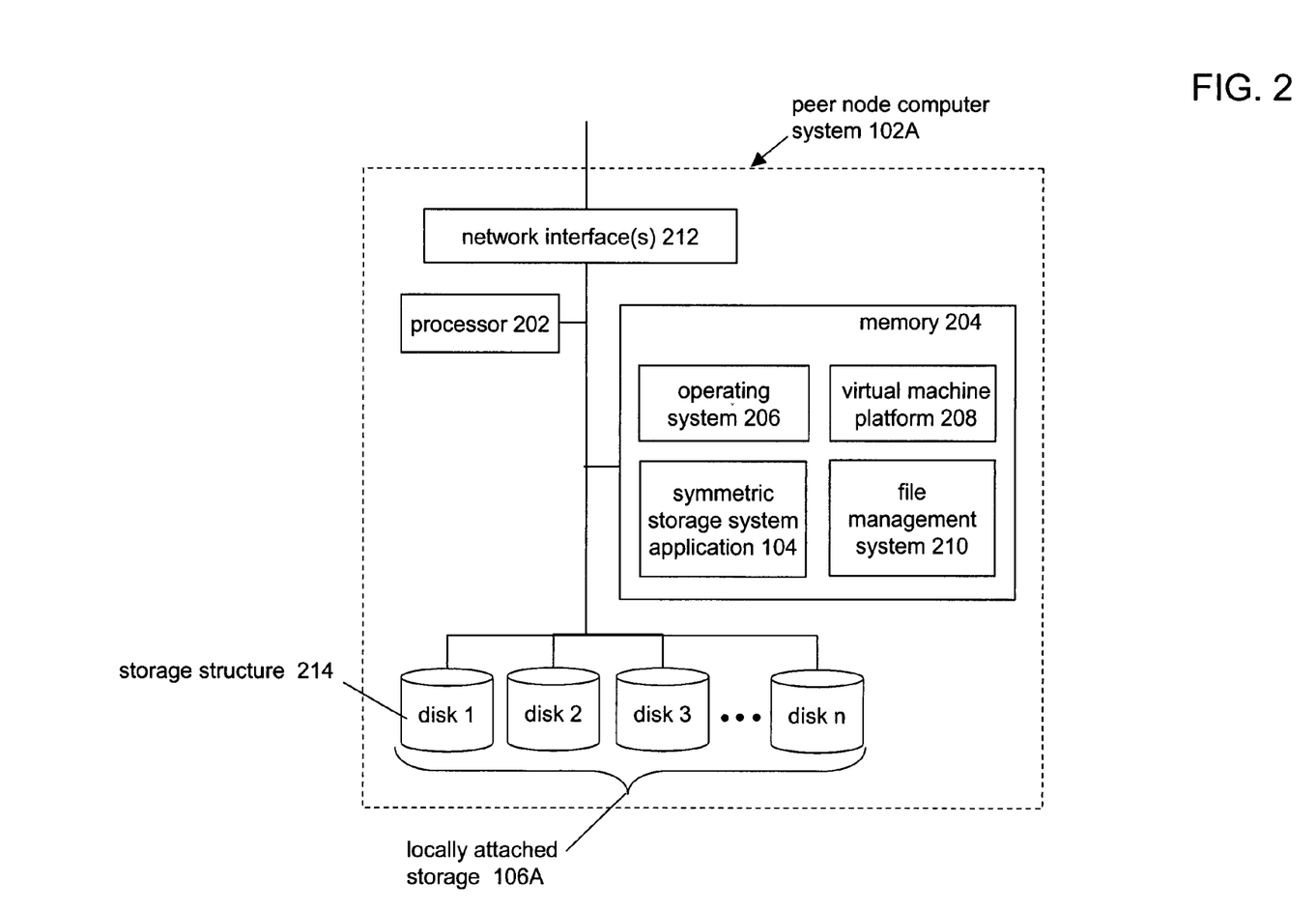
FIG. 2 illustrates one example of a peer node computer system in accordance with one embodiment of the invention.

FIG. 2 illustrates one example of peer node computer system 102A in accordance with one embodiment of the invention. Although the present embodiment is described with reference to peer node computer system 102A, herein node 102A, the description is applicable to any of nodes 102A-102n. It is to be understood that the present example is exemplary, and that other configurations and hardware are possible, in particular, locally attached storage 106A can be formed of fewer or greater numbers of storage structures, e.g., disk 1-disk n, and with individually different storage capacities.

In FIG. 2, in one embodiment, node 102A includes one or more network interface(s) 212 which provide connectivity to network 108 (including switch(es) 110). In embodiments where one or more switch(es) 110 are present in storage system 100, one or more corresponding network interface(s) 212 can be utilized on node 102A.

In the present embodiment, node 102A further includes: a processor 202; a memory 204; an operating system 206; a virtual machine platform 208; a file management system 210; symmetric storage system application 104; and locally attached storage 106A. In one embodiment, locally attached storage 106A includes one or more storage structures 214, such as a finite number of disks 1-n, for example, four disks.

In the present embodiment, node 102A is organized to be an ergonomically acceptable field replaceable unit (FRU), for example, in one embodiment, a 1U form factor FRU.

Figure 3:
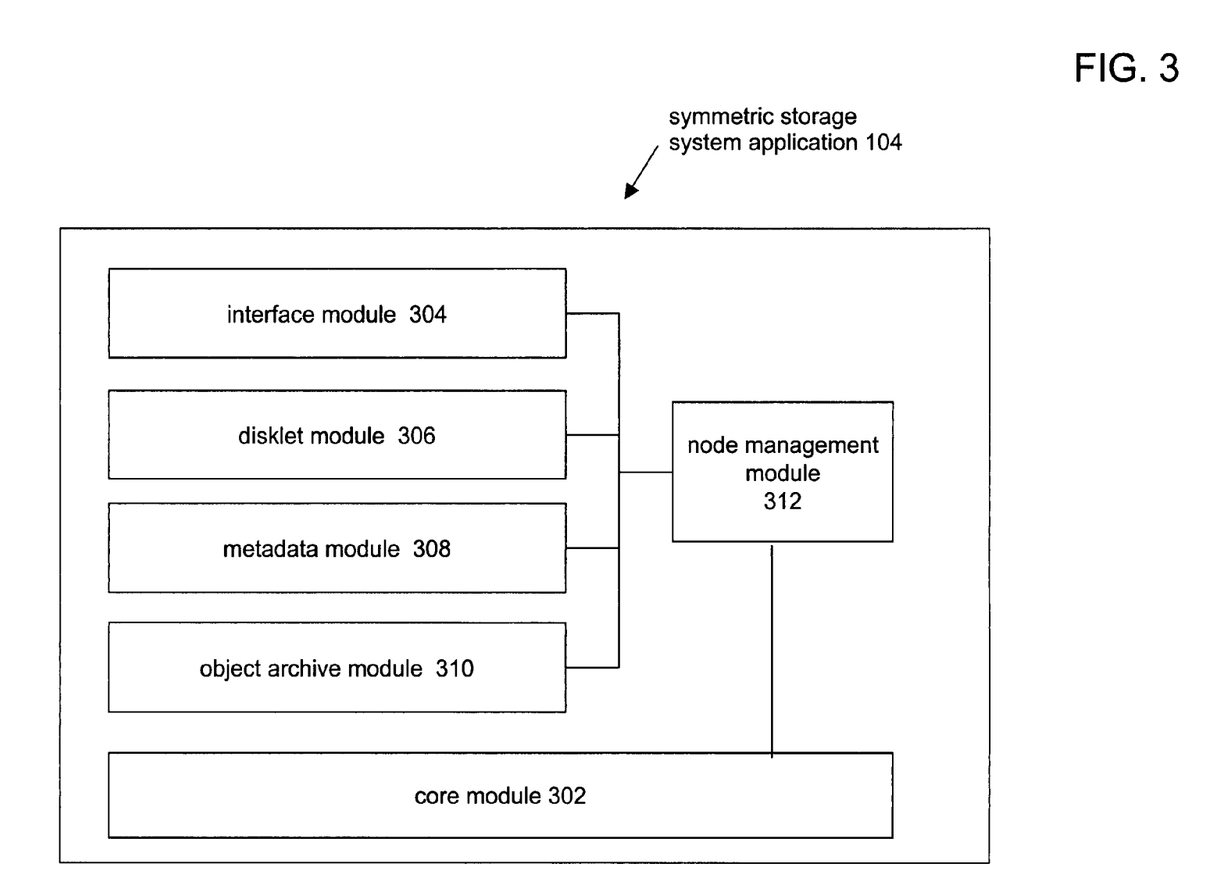
FIG. 3 illustrates a functional block diagram of a symmetric storage system application in accordance with one embodiment of the invention.

FIG. 3 illustrates a functional block diagram of symmetric storage system application 104 of node 102A in accordance with one embodiment of the invention. As illustrated in FIG. 3, in one embodiment, symmetric storage system application 104 includes: a core module 302; an interface module 304; a disklet module 306; a metadata module 308; an object archive module 310; and, a node management module 312.

In one embodiment, node management module 312 controls modules 302, 304, 306, 308, and 310 of symmetric storage system application 104, and, controls storage system 100 in instances when node 102A is the master node. Node management module 312 generates and maintains an overall view of storage system 100, herein termed a cell view, that includes information about nodes 102A-102n present in the cell and about which node is the currently acting master node.

Based on changes to the cell view, node management module 312 can independently start a recovery process to reconstruct data stored on a failed node 102B-102n or stored on a failed storage structure of locally attached storage device 106A.

In the present embodiment, node management module 312 includes a monitoring function and a management function. Node management module 312 monitors modules 302, 304, 306, 308, and 310 to gather information about the operational status of node 102A and storage system 100.

Node management module 312 has hooks, i.e., communication links, into interface module 304, disklet module 306, metadata module 308, and object archive module 310 to monitor each module in node 102A. Node management module 312 also communicates with core module 302 and monitors core module 302 for any events, such as error codes generated during the monitoring of the hardware. In the event core module 302 does not have the capability to perform hardware monitoring and event generation, node management module 312 includes mechanisms that permit it to assume these functions.

The monitoring function of node management module 312 generates events, as needed, that the management function acts on. The management function of node management module 312 includes response strategies for responding to different events, such as error codes, and executes the response strategies based on the event, for example, harvesting data, and rebooting a node, among others.

In one embodiment, the monitoring of modules 302, 304, 306, 308 and 310 is implemented using a near stateless communication process termed a shared mailbox, also conventionally termed a distributed mailbox, hints, or heartbeats. In shared mailbox communications each module 302, 304, 306, 308, 310, and 312 sends a "heartbeat" that indicates its status at a designated interval or time. Each module 302, 304, 306, 308, 310, and 312 does not have to be individually queried as to its status, but rather the "heartbeats" are monitored for any changes that require a response to be generated. Thus, each module 302, 304, 306, 308, and 310 is generally able to maintain its status without having to lock on to any particular process to provide its status. In one embodiment, the "heartbeat" of node management module 312 is monitored by a node management module of another node. For example, the "heartbeat" of node management module 312 in node 102A is monitored by a node management module in node 102B.

As earlier described, node management module 312 communicates with core module 302 and monitors core module 302 for any events, such as error codes generated during the monitoring of the hardware. In one embodiment, core module 302 includes information about the hardware of node 102A, such as the number, types, and layout of disks, the number and types of communication channels, processor 202, and network interface(s) 212. In one embodiment, core module 302 includes mechanisms to check the hardware of node 102A for errors, such as disk errors, and to generate events for communication to node management module 312. In the event core module 302 cannot check the hardware of node 102A, node management module 312 includes mechanisms to assume these functions.

Core module 302 also includes information about the operating system and other applications utilized on storage system 100 on node 102A. For example, referring to node 102A (FIG. 2), core module 302 includes information about operating system 206, virtual machine platform 208, and file management system 210. In some embodiments, core module 302 monitors operating system 206, virtual machine platform 208, and file management system 210.

Additionally, core module 302 includes a series of drivers that allow instructions to be passed between symmetric storage system application 104 and the hardware of node 102A.

In one embodiment, interface module 304 provides an internet protocol and overarching application program interface (API) to access storage system 100. In one embodiment, the internet protocol is Hypertext Transfer Protocol (HTTP), however in other embodiments, other protocols can be used. In one embodiment, the API is a Java® API, however in other embodiments, other APIs can be used.

Interface module 304 receives requests to store, e.g., write, read, and operate on data on storage system 100. Interface module 304 receives any metadata provided with data to be stored on storage system 100. Interface module 304 also receives disklets for storage and execution on storage system 100.

In one embodiment, disklet module 306 is responsible for managing the lifecycle of all disklets running on a node, e.g., loading a disklet, starting a disklet, stopping a disklet, and removing a disklet. In the present embodiment, all of the disklet types earlier described are managed by disklet module 306.

When disklet module 306 receives a request to execute a disklet, e.g., disklet 122, in one embodiment, disklet module 306 performs some load balancing to determine where disklet 122 will be executed on storage system 100. In one embodiment, disklet module 306 accesses information posted by each of nodes 102A-102n, such as in a cell view maintained by node management module 312, and selects a node 102A-102n on which to run disklet 122. In one embodiment, disklet module 306 selects a node 102A-102n based on selection criteria, such as the least loaded node 102A-102n, the node with greatest proximity to data, or some other selection criteria. Thus, although disklet 122 is received at a particular node 102A-102n, disklet module 306 can execute disklet 122 on any of nodes 102A-102n.

In one embodiment, disklet module 306 also logs and reports on the status of disklets executing on a node. This status information can include for example, whether a disklet is alive, the disklet state (initialized, running, stopped), the amount of processing consumed, area of heap currently occupied, bytes read from storage system 100, an audit log of invoked APIs, sockets opened by the disklet (such as destination ports), and bytes sent by the disklet. In one embodiment, disklet module 306 writes selected disklet status information to the mailbox of node management module 312.

In one embodiment, disklet module 306 also maintains a cache of status information on all disklets registered on storage system 100. In one embodiment, disklet module 306 can access information maintained by the master node to determine the status of disklets on storage system 100.

In one embodiment, disklet module 306 implements disklet security to prevent disklets from inadvertently or maliciously damaging storage system 100. In one embodiment, disklet module 306 utilizes a security class loader, such as a Java® security class loader, that selectively assign permissions, for example, based on the user invoking the disklet. The assignment of permissions is controlled via system security policies set and maintained on storage system 100. For example, storage system 100 can be configured by a system administrator with a security policy that allows disklets from certain users to only read data from storage system 100. Another security policy can allow execution priority and/or higher heap limits to a disklet from a particular user(s).

Security class loaders and Java® security class loaders are well known in the art and are not further described to avoid detracting from the description of the present invention. Thus, in one embodiment, disklet security is not implemented until execution of a disklet, at which time the security class loader of disklet module 306 is utilized to ensure disklets adhere to established security policies.

In an alternative embodiment, a new disklet is initially read by a security application of disklet module 306 that determines whether disklet 122 is approved for use on storage system 100. In one embodiment, an approved disklet is identified as approved, e.g., signed, and allowed to be used on storage system 100, i.e., allowed to register. A non-approved disklet is not identified as approved, e.g., not signed, and can be deleted, quarantined, or processed for further security evaluation. In some embodiments, a notification is generated advising a user that a disklet is not approved.

In one embodiment, disklet module 306 also provides support for libraries. Depending upon configured system policies, even native libraries can be supported. In one embodiment, libraries are loaded onto storage system 100 and are stored on storage system 100. In one embodiment, a disklet can specify, for example, in metadata associated with the disklet, which libraries to use, and disklet module 306 can add those libraries to the class path of the launched disklet.

In one embodiment, object archive module 310 distributively stores, retrieves, and reconstructs data objects in storage system 100. Retrieval and reconstruction of data objects in storage system 100 is based upon the mechanism of storage implemented by object archive module 310.

In storing a data object, object archive module 310 determines placement, fragmentation, and storage of a data object. During placement, object archive module 310 receives a data object and determines a set of storage structures, such as storage disks, to be used in distributively storing fragments of the data object, including data fragments and parity fragments.

In one embodiment, object archive module 310 generates a random, and reproducible, layout map identifier (ID) that is assigned to the data object. While non-random layout map IDs may be used, assignment of randomized layout map IDs allows data objects to be evenly distributed among storage structures of locally attached storage 106A-106n in storage system 100, even if some of nodes 102A-102n are removed or added.

The layout map ID is used to generate a layout map which represents possible distributed layouts for that data object in storage system 100 based on the current availability of storage structures, for example storage disks, in locally attached storage 106A-106n. In one embodiment, object archive 310 maintains a current view of the available storage structures in storage system 100, herein termed a disk mask, for use in generating layout maps. In one embodiment, a layout map indicates an initial distribution, or initial layout, of fragments for a data object in selected storage structures of one or more of locally attached storage 106A-106n, as well as alternative locations for fragments, such as when a storage structure in the initial layout fails or otherwise becomes unavailable or when a previously unavailable storage structure becomes available.

Figure 4:
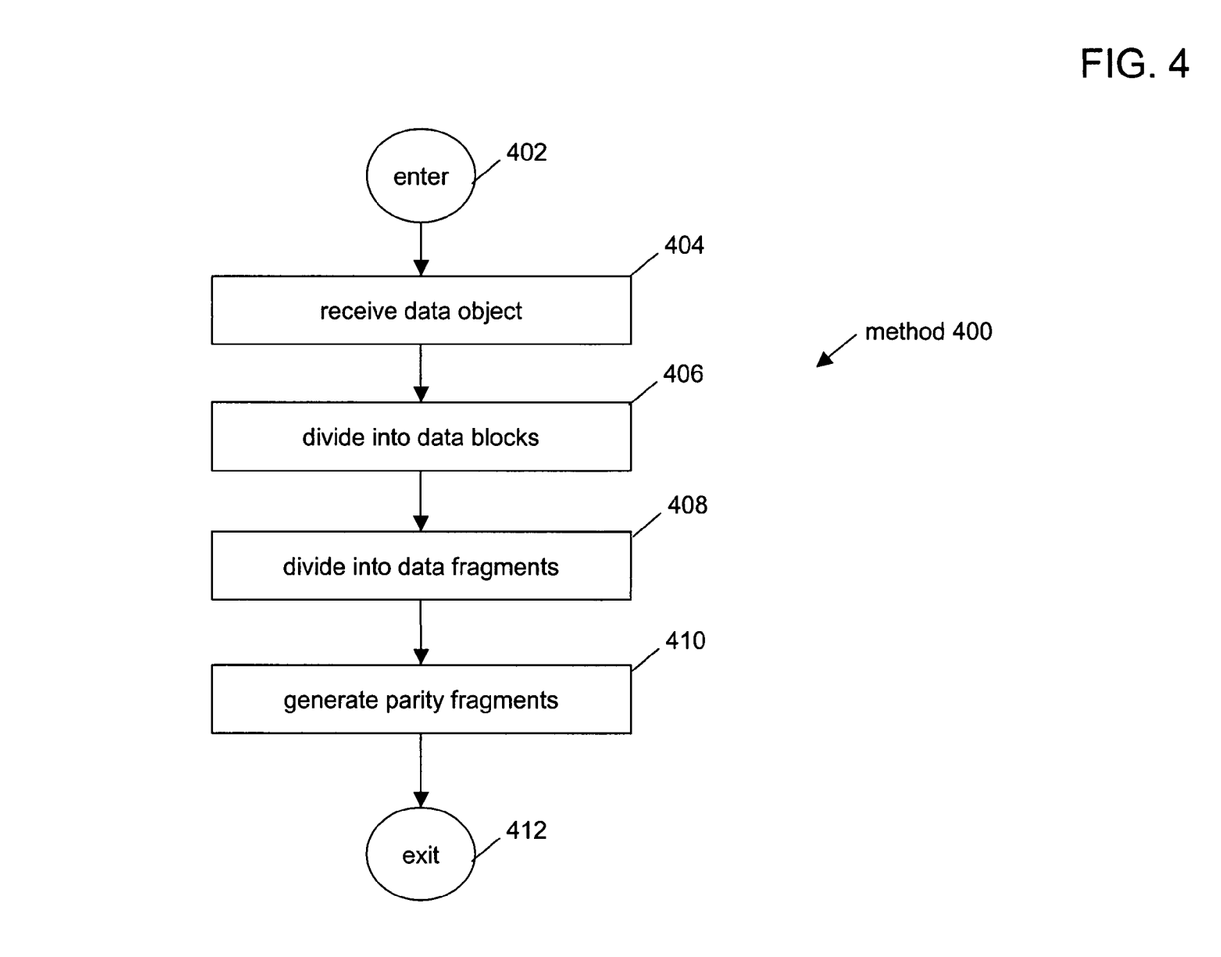
FIG. 4 illustrates a process flow diagram of a method for dividing a data object into data fragments with the generation of parity fragments in accordance with one embodiment of the invention.
Figure 5:
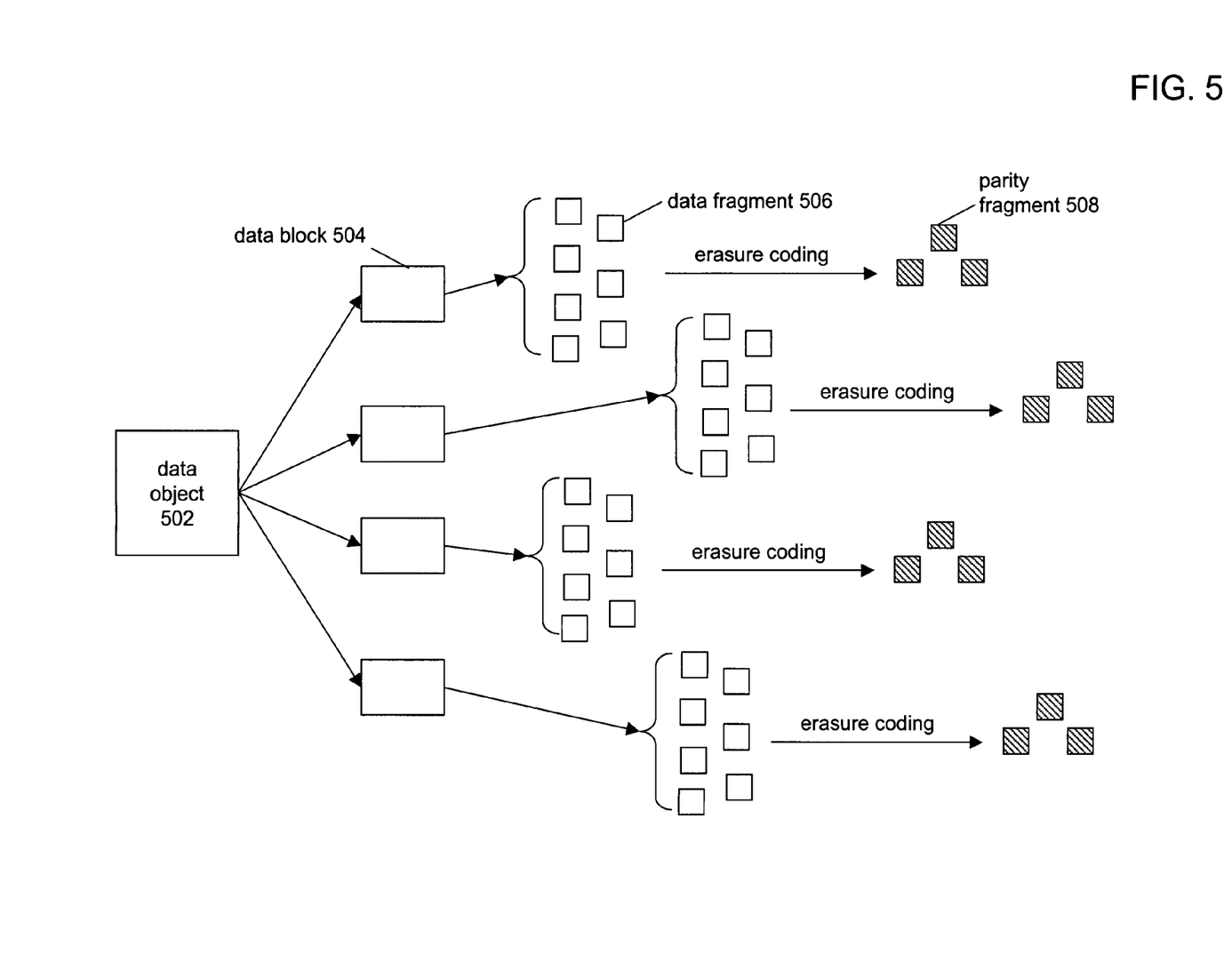
FIG. 5 illustrates the method of FIG. 4 in accordance with one embodiment of the invention.

In fragmentation of a data object, in one embodiment, object archive module 310 divides the data object into data fragments and further generates parity fragments as further described herein with reference to FIGS. 4 and 5.

FIG. 4 illustrates a process flow diagram of a method 400 for dividing a data object into data fragments with the generation of parity fragments in accordance with one embodiment of the invention. FIG. 5 illustrates method 400 in accordance with one embodiment of the invention. In one embodiment, method 400 (FIG. 4) is implemented by object archive module 310 (FIG. 3) of symmetric storage system application 104 (FIG. 2). Referring initially to FIG. 4, in one embodiment, from an ENTER operation 402, flow transfers to a RECEIVE DATA OBJECT operation 404.

In RECEIVE DATA OBJECT operation 404, referring now to FIGS. 3, 4, and 5, object archive module 310 receives a data object 502 for storage in storage system 100 (FIG. 1). In one embodiment, object archive module 310 generates a unique object identifier (ID) for the data object. In one embodiment, the object ID is generated based upon an intrinsic property of the data object. In one embodiment, the object ID is generated based upon the content of the data object.

In one embodiment, object archive module 310 generates the object ID for data object 502 using an SHA-1 hash of the data object contents. In other embodiments, the object ID can be generated based upon other intrinsic properties of the data object that result in a unique object ID. Uniquely identifying a data object based on its content or other intrinsic property of the data object, enables the unique identifier, e.g., the object ID, to be used as an identifier of the data object in storage system 100 and provides content addressability. Upon receipt of data object 502 and generation of the object ID, flow transitions from RECEIVE DATA OBJECT operation 404 to a DIVIDE INTO DATA BLOCKS operation 406.

In DIVIDE INTO DATA BLOCKS operation 406, object archive module 310 divides data object 502 into one or more data blocks 504. Herein a data block is a portion of a data object, such as a logical data size that operating system 206 uses to read or write files, for example, 384 KB. In one embodiment, based on the object ID, any of data blocks 504 can be distributed to any of the other nodes 102B-102n in storage system 100 and the remainder of method 400 performed at those other nodes 102B-102n. Upon division of data object 502 into data blocks 504, flow transitions from DIVIDE INTO DATA BLOCKS operation 406 to a DIVIDE INTO DATA FRAGMENTS operation 408.

In DIVIDE INTO DATA FRAGMENTS operation 408, object archive module 310 divides each of data blocks 504 into one or more data fragments 506. Herein a data fragment is a portion of a data block, such as 64 KB on disk. Upon division of each of data blocks 504 into data fragments 506, flow transitions from DIVIDE INTO DATA FRAGMENTS operation 408 to a GENERATE PARITY FRAGMENTS operation 410.

In GENERATE PARITY FRAGMENTS operation 410, object archive module 310 applies an erasure coding algorithm, such as a Reed-Solomon erasure coding algorithm, to data fragments 506 from each of data blocks 504 to generate one or more parity fragments 508. In one embodiment, any parity fragment 508 can be used to generate any data fragment 506 of data block 504 of data object 502. In one embodiment, the erasure coding algorithm utilizes an external criterion, such as a desired reliability of storage, in generating parity fragments 508. Upon generation of parity fragments 508, flow transitions from GENERATE PARITY FRAGMENTS operation 410 and exits method 400 at an EXIT operation 412.

In an alternative embodiment, object archive module 310 divides data object 502 directly into data fragments 506 and the erasure coding algorithm is applied to data fragments 506 to generate parity fragments 508, e.g., operation 406 is not performed. Although division of data object 502 into data blocks 504 is not a required intermediate operation to division of data object 502 into fragments 506, it enables parallelization of operations 408 and 410 by enabling data blocks 504 to be distributed to other nodes 102B-102n where the generation of data fragments 506 and parity fragments 508 can occur.

Following generation of the data fragments and parity fragments (method 400), object archive module 310 stores the data fragments of the data object and the parity fragments associated with the data object to one or more storage structures, e.g., storage disks, in storage system 100, in accordance with the layout map associated with the data object. In one embodiment, object archive 310 periodically evaluates the storage structures in locally attached storage 106A, for example by checking disk segments of disks, and reporting problems to node management module 312 (FIG. 3).

During placement, fragmentation, and storage of a data object, object archive module 310 also generates metadata associated with the data object. Metadata is data that provides a description of a data object stored in storage system 100, and is used to perform searches and retrieve data in storage system 100. In particular, object archive module 310 generates system metadata which is metadata that is stored, e.g., encapsulated, as part of each of the data fragments and parity fragments of that data object.

In one embodiment, system metadata includes information that is utilized by object archive module 310 to retrieve and reconstruct a data object once a data fragment of that data object is located. Examples of system metadata include number of data fragments, number of parity fragments, the layout for a data object, the data fragment length, the size of a data object, and the create time for a data object. System metadata generated by object archive module 310 are also provided to metadata module 308.

In one embodiment, metadata module 308 receives metadata from metadata generators, such as an object archive, e.g., object archive module 310, a client, e.g., a client application program interface (API), or a disklet, e.g., an executing disklet. In one embodiment, as earlier described with reference to object archive module 310, metadata received from object archive module 310 is termed system metadata. Other metadata, such as metadata received from a client or generated in accordance with disklet, is termed extended metadata.

Extended metadata received by metadata module 308 is passed to object archive 310 for distributed storage on storage system 100. In one embodiment, metadata module 308 computes a deterministic layout map identifier, herein termed a metadata layout map ID, and provides the metadata layout map ID to object archive module 310.

Object archive module 310 determines the placement of the metadata based on the metadata map ID. In one embodiment, object archive module 310 uses the metadata layout map ID to generate a metadata layout map for storing the metadata. Object archive module 310 fragments the metadata similar to a data object as earlier described with reference to FIGS. 4 and 5 with resultant metadata data fragments and metadata parity fragments. Following generation of the metadata data fragments and metadata parity fragments, object archive module 310 stores the metadata data fragments and the metadata parity fragments to one or more storage structures, e.g., disks, in storage system 100, in accordance the metadata layout map.

In one embodiment, metadata module 308 further indexes selected metadata, e.g., selected from the system metadata and/or extended metadata, into one or more metadata caches. In one embodiment, each metadata cache is a relational database of selected metadata. In one embodiment, each metadata cache is extensible.

The metadata caches are distributively stored on storage system 100 and used to enhance searching and retrieval of data objects on storage system 100, e.g., by searching the metadata caches rather than the object archive.

Figure 6:
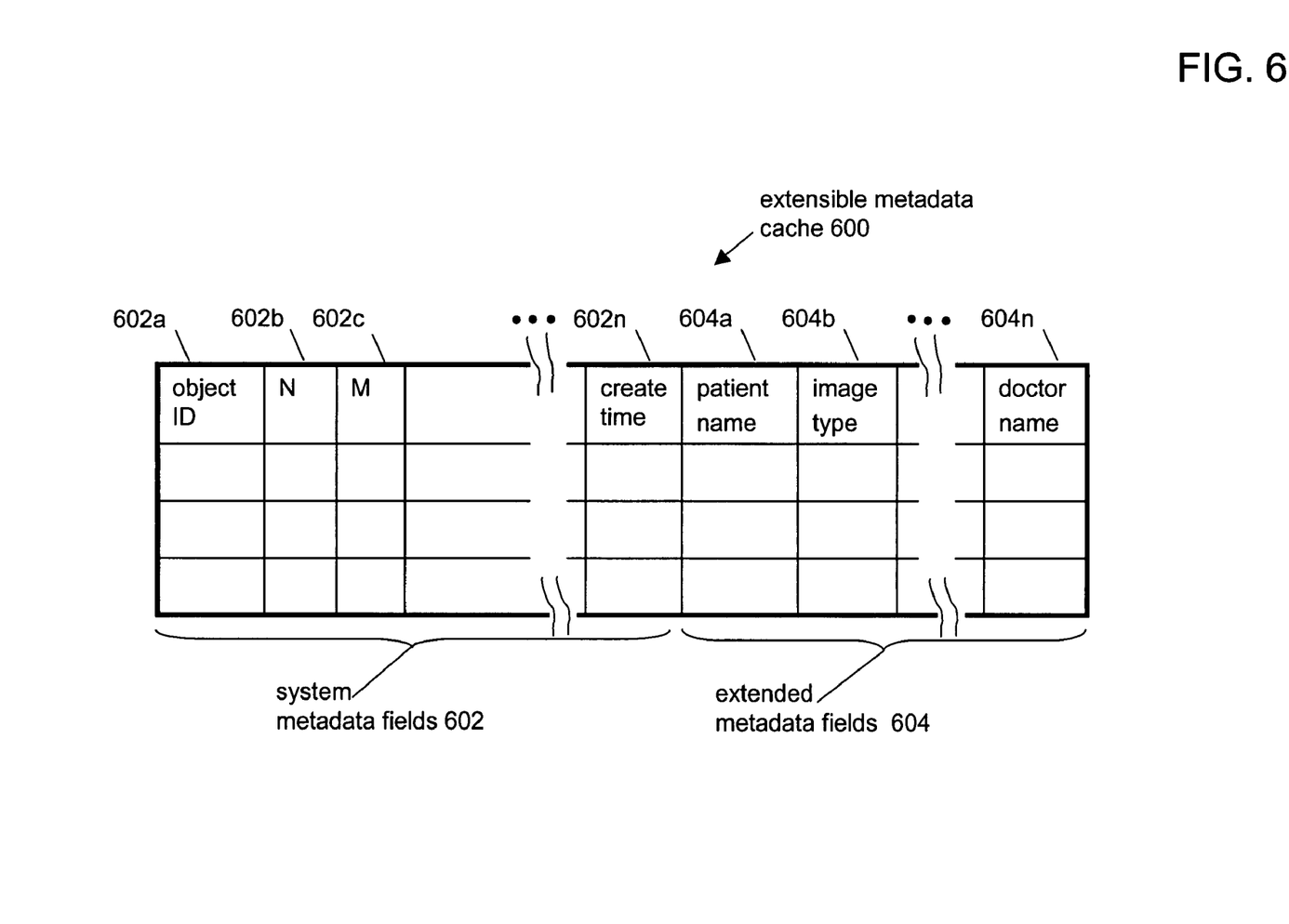
FIG. 6 illustrates a block diagram of an extensible metadata cache in accordance with one embodiment of the invention.

FIG. 6 illustrates a block diagram of an extensible metadata cache 600 in accordance with one embodiment of the invention. In FIG. 6, extensible metadata cache 600 includes system metadata fields 602, such as system metadata fields 602A-602n, and extended metadata fields 604, such as extended metadata fields 604A-604n. For example, system metadata fields 602A-602n can include: an object ID field 602A (an object ID of a data object); an "N" field 602B (number of data fragments); an "M" field 602C (number of parity fragments; and a size field 602n (size of a data object). Extended metadata fields 604A-604n, such as for those metadata generated in response to execution of a disklet on storage system 100, can include: a patient name field 604A; an image type field 604B; and a doctor name field 604n. In one embodiment, the number of extended metadata fields is definable by a system administrator of storage system 100.

In one embodiment, the metadata caches generated by metadata module 308 can be replicated on any of nodes 102A-102n to provide a desired reliability. The metadata caches are scalable with the size of storage system 100 and can be distributed across nodes 102A-102n. In some embodiments, metadata module 308 can further generate metadata caches associated with selected parameters of a data object, such as a type of data object, or with a particular metadata generator.

As earlier described with reference to FIGS. 1 and 3, a disklet, e.g., disklet 122, is program code that includes a disklet interface that permits the disklet to be transferred to, executed on, and managed by storage system 100. In one embodiment, disklet 122 is implemented in Java® byte code using a disklet interface, such as a Java® API.

In one embodiment, disklets are identified by disklet type, and a disklet is implemented on storage system 100 based on its disklet type. In one embodiment, three (3) disklet types are distinguished: a foreground disklet, a trigger disklet, and a background disklet.

In one embodiment, a foreground disklet is code, e.g., Java® byte code, specified by a user to operate on data objects during a specific transaction, such as store or read. In one embodiment, when a user initiates a transaction, the user identifies the disklet to be used in the transaction, and any parameters needed for the disklet to function. In one embodiment, the user identifies the Java® class name of the disklet, the disklet ID, e.g., handle, and any parameters needed by the disklet. More than one foreground disklet can be specified, allowing a user to chain foreground disklets together.

For example, during a store operation, a user can identify a disklet that encrypts data. The user inputs the request to store specified data and identifies the encryption disklet to be executed on the data being stored. During the store operation, the data are first processed by the encryption disklet and then stored on storage system 100.

Differently, a trigger disklet is not specified at each transaction by a user, but rather is code that is automatically initiated, e.g., triggered, by a characteristic of the transaction or the data, and can be triggered based on metadata associated with the data. A trigger disklet is defined cell wide and modifies the behavior of a function or functions of storage system 100. Consequently, a trigger disklet is defined by a controlling client of storage system 100, such as a super user or independent software vendor. Trigger disklets allow storage system 100 to be customized at a level above a user for different clients.

For example, during a store operation, a trigger disklet is automatically initiated based on the file type of the data, for example, to encrypt medical image files prior to storing or, differently, to compress medical history text files prior to storing.

In one embodiment, a background disklet is code that is executed in the background to perform some operation, such as a scanning operation. A background disklet can run for a long period of time and runs asynchronously. A background disklet can be assigned privileges to read/write/remove files to assist in data management. Based on the privileges, a background disklet can be written and employed by either a super user or a regular user. Disklets are stored on storage system 100 through a method herein termed registering further described herein with reference to FIG. 7, and removed (or otherwise made unavailable) through a method herein termed unregistering further described herein with reference to FIG. 8.

Figure 7:
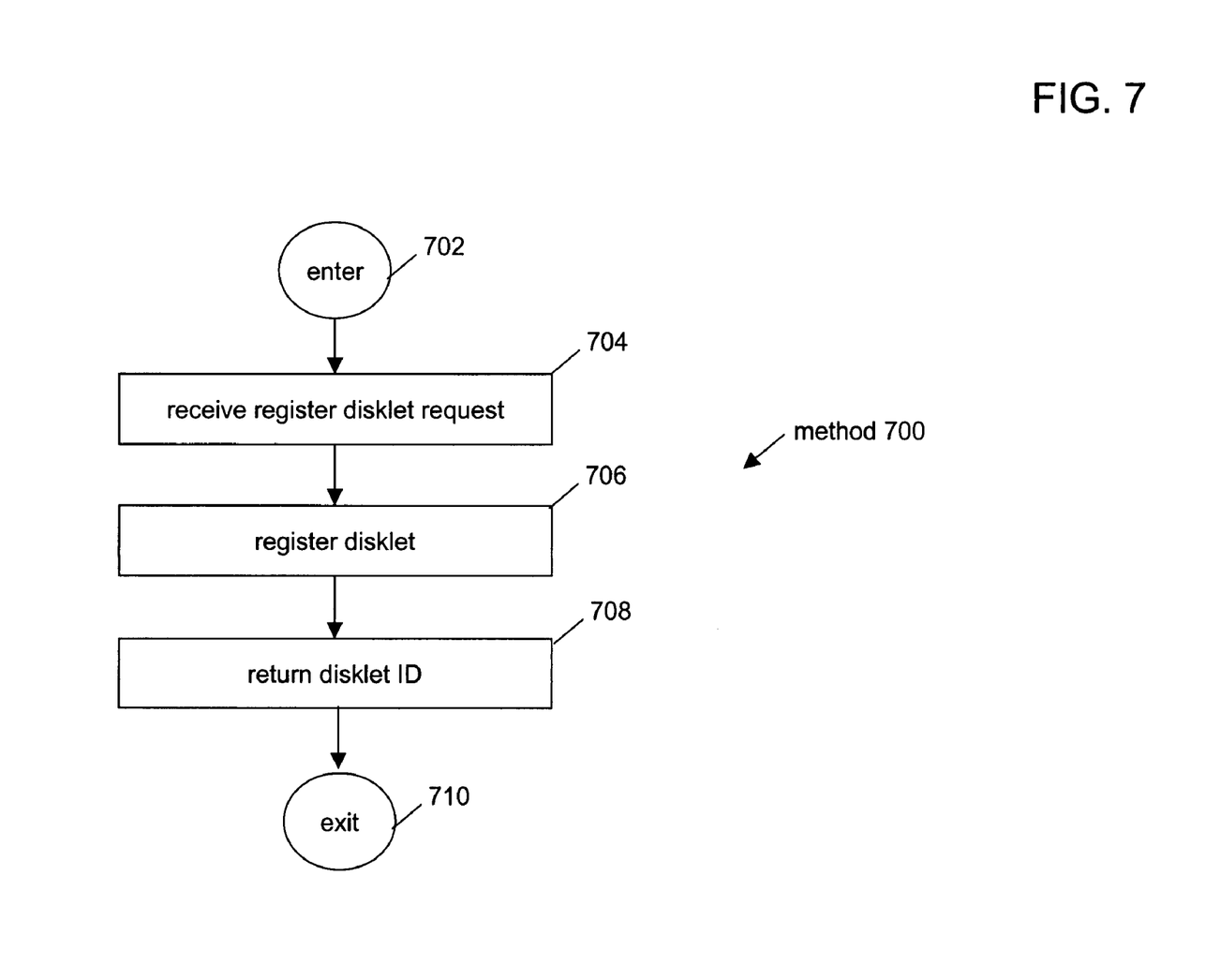
FIG. 7 illustrates a process flow diagram of a method for registering a disklet on the data storage system of FIG. 1 in accordance with one embodiment of the invention.

FIG. 7 illustrates a process flow diagram of a method 700 for registering disklet 122 on storage system 100 in accordance with one embodiment of the invention. In one embodiment, from an ENTER operation 702, processing transitions to a RECEIVE DISKLET operation 704.

In RECEIVE REGISTER DISKLET REQUEST operation 704, switch 110 receives a request to register disklet 122 with storage system 100. In one embodiment, the request is compatible with the application program interface (API) utilized by switch 110 to allow the request to be processed by storage system 100. Switch 110 directs the request for processing by a node 102A-102n, for example, in accordance with a load spreading schema, and processing transitions from RECEIVE REGISTER DISKLET REQUEST operation 704 to a REGISTER DISKLET operation 706.

In REGISTER DISKLET operation 706, disklet module 306 of the selected node 102A-102n coordinates with object archive module 310 to store disklet 122 on storage system 100. In one embodiment, disklet 122 is stored as earlier described with reference to data objects and method 400 with the generation of an object identifier by object archive module 310. Disklet module 306 obtains the object identifier (ID) for disklet 122 and assigns a class name, such as a Java® class name. Disklet module updates an internal cache of disklets registered on storage system 100 to include information on disklet 122 and posts updated information associated with the registration of disklet 122 to data storage system 100, for example, via node management module 312. Disklet module 306 sends metadata associated with disklet 122 to metadata module 308 for indexing in a metadata cache. From REGISTER DISKLET operation 706, processing transitions to a RETURN DISKLET ID operation 708.

In RETURN DISKLET ID operation 708, disklet module 306 returns the object ID and class name assigned to disklet 122 to the user. In one embodiment, the object ID and class name are termed the disklet ID. The disklet ID is specified by a user to initiate execution of disklet 122 on storage system 100. In one embodiment, a confirmation of the disklet registration is also returned to the user, and from RETURN DISKLET operation 708, processing transitions to an EXIT operation 710 and exits method 700.

Figure 8:
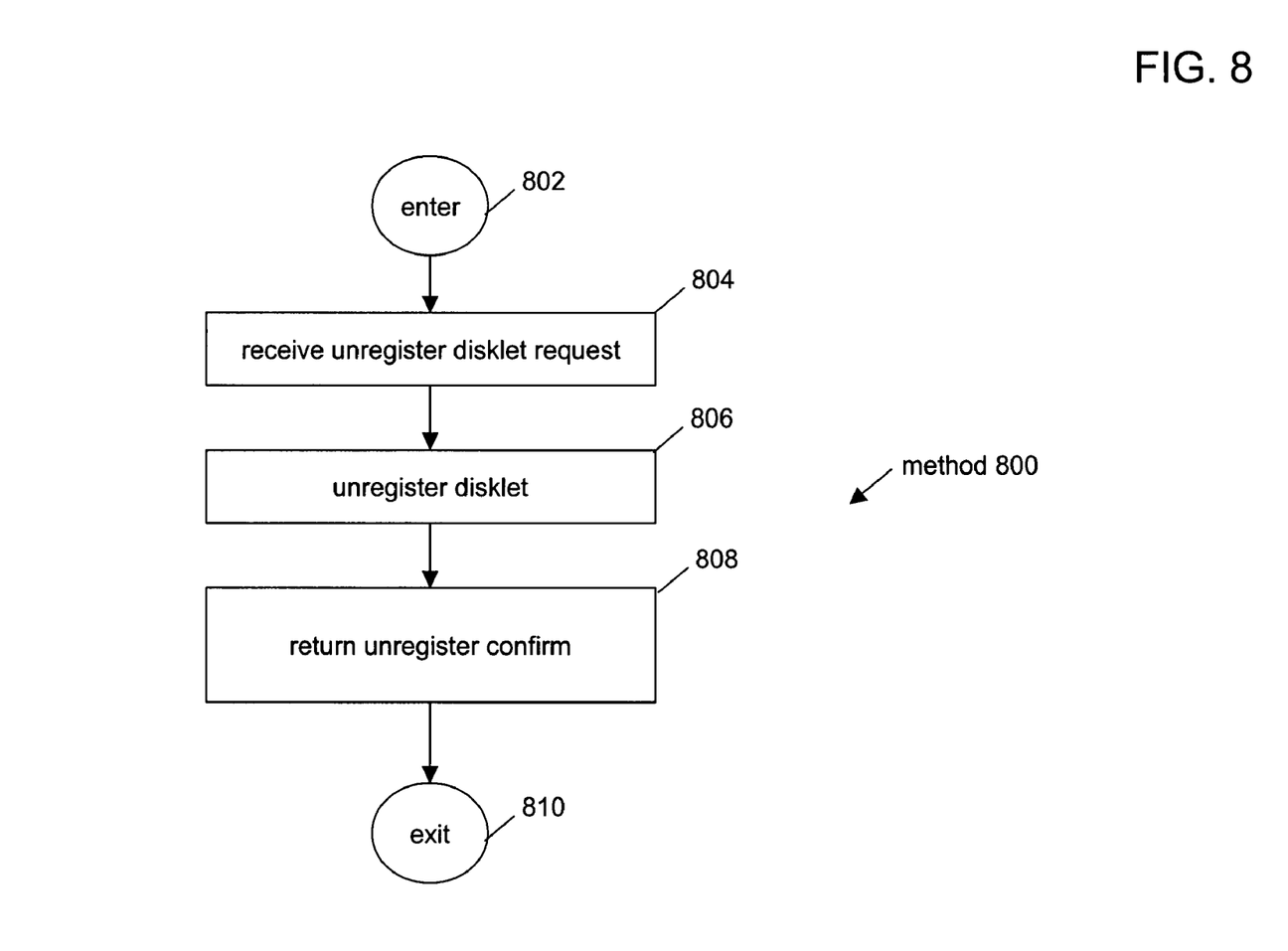
FIG. 8 illustrates a process flow diagram of a method for unregistering a disklet on the data storage system of FIG. 1 in accordance with one embodiment of the invention.

Disklets that are registered on storage system 100 can also be unregistered, as further described herein with reference to FIG. 8. FIG. 8 illustrates a process flow diagram of a method 800 for unregistering disklet 122 on storage system 100 in accordance with one embodiment of the invention. In one embodiment, from an ENTER operation 802, processing transitions to a RECEIVE UNREGISTER DISKLET REQUEST operation 804.

In RECEIVE UNREGISTER DISKLET REQUEST operation 804, switch 110 receives a request to unregister disklet 122 with storage system 100. In one embodiment, the request is compatible with the application program interface (API) utilized by switch 110 to allow the request to be processed by storage system 100. Switch 110 directs the request for processing by a node 102A-102n, for example, in accordance with a load spreading schema, and processing transitions from RECEIVE UNREGISTER DISKLET REQUEST operation 804 to an UNREGISTER DISKLET operation 806.

In UNREGISTER DISKLET operation 806, disklet module 306 of the selected node 102A-102n receives the request and removes references to disklet 122 on storage system 100, and, in some embodiments, can initiate deletion of the disklet code. In one embodiment, disklet module 306 coordinates with object archive module 310, metadata module 308, and node management module 312 to remove references to disklet 122 from storage system 100. Disklet module 306 updates its internal cache of disklets registered on storage system 100 and posts information related to the unregistering of disklet 122 to data storage system 100, for example, via node management module 312. From UNREGISTER DISKLET operation 806, processing transitions to a RETURN UNREGISTER CONFIRM operation 808.

In RETURN UNREGISTER CONFIRM operation 808, disklet module 306 returns a confirmation to the user that disklet 122 is unregistered, and processing transitions from RETURN UNREGISTER CONFIRM operation 808 to an EXIT operation 810 with processing exiting method 800.

In one embodiment, symmetric storage system application 104 can be configured as a computer program product. Herein a computer program product comprises a medium configured to store or transport computer-readable instructions, such as program code for symmetric storage system application 104, including all, any, or parts of processes described herein with reference to FIGS. 1-8, or in which computer-readable instructions for symmetric storage system application 104, including all, any, or parts of processes described herein with reference to FIGS. 1-8 are stored. Some examples of computer program products are CD-ROM discs, ROM cards, floppy discs, magnetic tapes, computer hard drives, servers on a network and signals transmitted over a network representing computer-readable instructions. Further herein, a means for performing a particular function is accomplished using the appropriate computer-readable instructions and the related hardware necessary to perform the function.

As described above, storage system 100 permits a user to upload disklets and to execute the disklets on storage system 100 using data objects that are stored on, being written to, or being read from storage system 100 and to generate results accessible by the user.

Executing disklets close to the stored data, e.g., data objects, provides reduced output data transfer loads over execution of programs run separate from storage system 100, such as when an application requires scanning of a large portion of stored data to produce a small result set, for example, searches, data mining.

Additionally, the use of disklets on storage system 100 allows for extended programmability of storage system 100. For example, it is possible to redefine function APIs by using disklets, for example, to encrypt or compress data.

The use of disklets on storage system 100 also permits implementation of data management policies, such as in accordance with regulatory policies for maintaining and deleting data on storage system 100.

Additionally, the use of disklets on storage system 100 in conjunction with metadata search and indexing functions, eliminate the need for a user to deploy expensive computer servers to access and operate on the stored data. Storage system 100 has compute capacity that scales with the size of the storage capacity and can be utilized for compute tasks.

The foregoing description of implementations of the invention have been presented for purposes of illustration and description only, and, therefore, are not exhaustive and do not limit the invention to the precise forms disclosed. Modifications and variations are possible in light of the above teachings or can be acquired from practicing the invention. Consequently, Applicants do not wish to be limited to the specific embodiments shown for illustrative purposes.

What is claimed is:

1. A data storage system comprising:
   a storage system network; and
   one or more peer node computer systems interconnected by said storage system network, each of said one or more peer node computer systems for storing one or more data objects; and
   at least one disklet stored on at least one of said one or more peer node computer systems, wherein said at least one disklet comprises:
   program code, and
   a disklet interface, said disklet interface allowing said disklet to interact with said data storage system and permit remote execution of said program code on said data storage system,
   wherein said disklet is received on said data storage system from a computer system external to said data storage system, and
   further wherein said disklet is registered on said data storage system and a disklet identifier (ID) identifying said disklet is generated and returned to a user.

2. The data storage system of claim 1, wherein said at least one disklet is executed on said data storage system using at least one data object being written to said data storage system.

3. The data storage system of claim 1, wherein said at least one disklet is executed on said data storage system using at least one data object being read from said data storage system.

4. The data storage system of claim 1, wherein said at least one disklet is executed on said data storage system using at least one data object stored on said data storage system.

5. The data storage system of claim 1, wherein each of said one or more peer node computer systems comprises:
a disklet module, said disklet module for managing the life cycle of said at least one disklet on said data storage system.

6. The data storage system of claim 1, wherein said at least one disklet is a foreground disklet.

7. The data storage system of claim 1, wherein said at least one disklet is a background disklet.

8. The data storage system of claim 1, wherein said at least one disklet is a trigger disklet.

9. The data storage system of claim 1, wherein said disklet is executed on said data storage system in response to a transaction specific user input to said data storage system.

10. The data storage system of claim 1, wherein said disklet is automatically executed on said data storage system.

11. A disklet comprising:
program code for execution on a data storage system; and
a disklet interface, said disklet interface allowing said disklet to interact with said data storage system and permit remote execution of said program code on said data storage system,
wherein said disklet is received on said data storage system from a computer system external to said data storage system, and
further wherein said disklet is registered on said data storage system and a disklet identifier (ID) identifying said disklet is generated and returned to a user.

12. The disklet of claim 11, wherein said disklet interface permits said disklet to be transferred to, executed on, and managed by said data storage system.

13. The disklet of claim 11, wherein said code is Java® byte code, and
further wherein said disklet interface is a Java® application program interface (API).

14. A data storage system comprising:
means for receiving a disklet on said data storage system, wherein said disklet is received on said data storage system from a computer system external to said data storage system, said disklet comprising:
program code, and
a disklet interface, said disklet interface allowing said disklet to interact with said data storage system and permit remote execution of said program code on said data storage system;
means for storing said disklet on said data storage system;
means for remotely executing said program code on said data storage system; and
means for unregistering said disklet.

15. A data storage system comprising:
means for receiving a disklet on said data storage system, wherein said disklet is received on said data storage system from a computer system external to said data storage system, said disklet comprising:
program code, and
a disklet interface, said disklet interface allowing said disklet to interact with said data storage system and permit remote execution of said program code on said data storage system;
means for storing said disklet on said data storage system;
means for remotely executing said program code on said data storage system; and
means for removing said disklet.

16. The data storage system of claim 14, further comprising:
means for registering said disklet.

17. The data storage system of claim 14, further comprising:
means for initiating execution of said disklet by a user external to said data storage system.

18. A method for registering a disklet on a data storage system, said method comprising:
receiving a request from a user to register said disklet on said data storage system, said disklet comprising:
program code, and
a disklet interface, said disklet interface allowing said disklet to interact with said data storage system and permit remote execution of said program code on said data storage system;
transferring said disklet to said data storage system;
storing said disklet on said data storage system;
generating a disklet identifier (ID) identifying said disklet; and
returning said disklet ID to said user.

19. A method for unregistering a disklet registered on a data storage system, said method comprising:
receiving a request from a user to unregister said disklet on said data storage system, said disklet comprising:
program code, and
a disklet interface, said disklet interface allowing said disklet to interact with said data storage system and permit remote execution of said program code on said data storage system;
removing references to said disklet on said data storage system; and
providing a notification that said disklet is unregistered.

20. The method of claim 19, further comprising:
deleting said disklet from said data storage system.

* * * * *